Dec. 30, 1958   J. J. A. ROBILLARD   2,866,935
TRANSIENT MEASURING APPARATUS
Filed Feb. 6, 1956   2 Sheets-Sheet 1
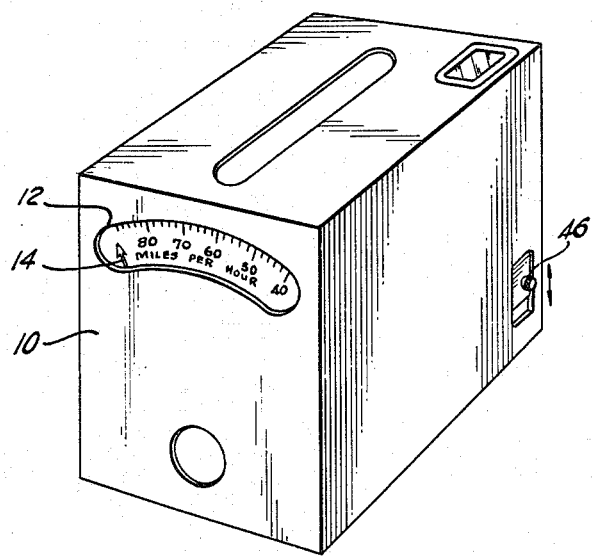
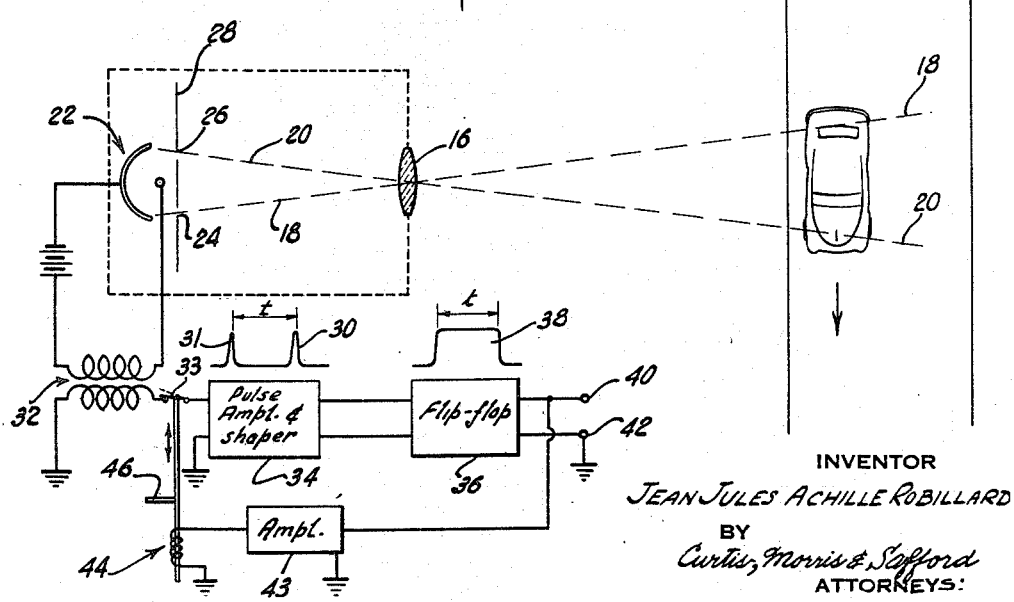
INVENTOR
JEAN JULES ACHILLE ROBILLARD
BY
Curtis, Morris & Safford
ATTORNEYS:

Dec. 30, 1958  J. J. A. ROBILLARD  2,866,935
TRANSIENT MEASURING APPARATUS
Filed Feb. 6, 1956  2 Sheets-Sheet 2
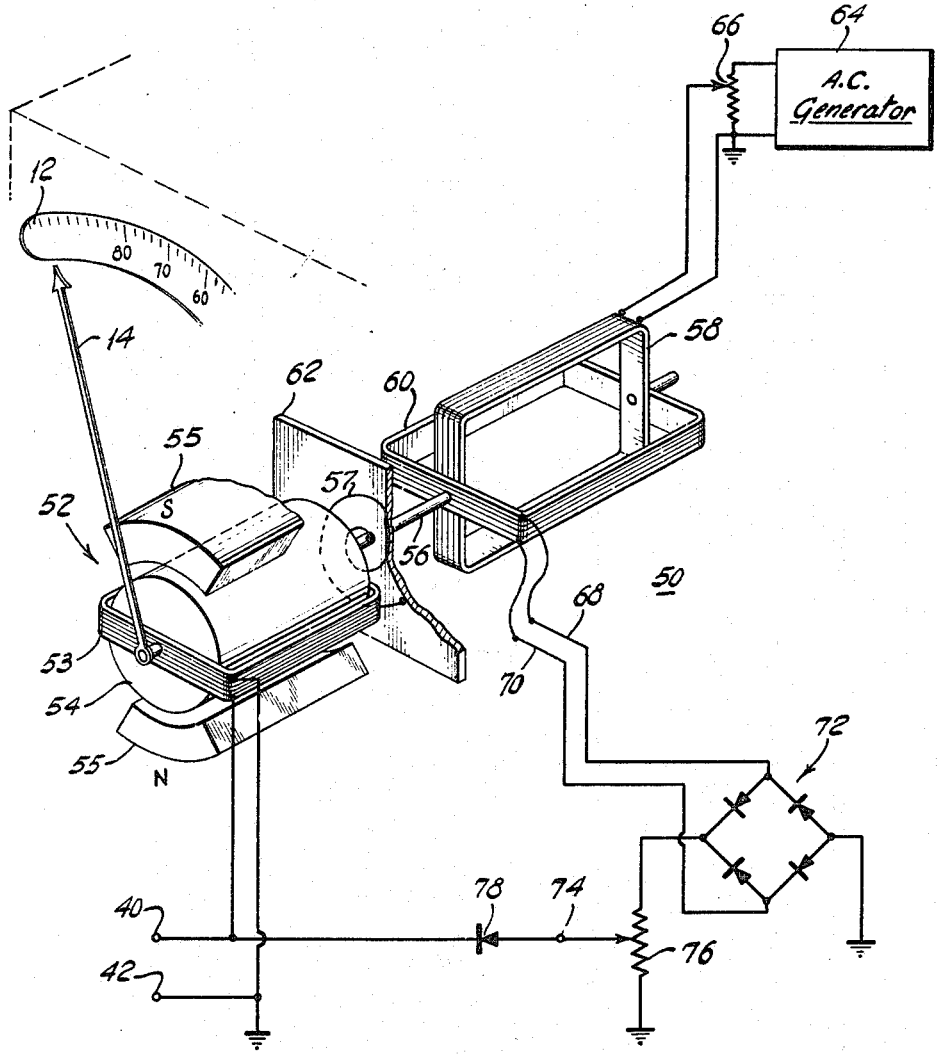
INVENTOR
JEAN JULES ACHILLE ROBILLARD
BY
Curtis, Morris & Safford
ATTORNEYS United States Patent Office 2,866,935
Patented Dec. 30, 1958

2,866,935

TRANSIENT MEASURING APPARATUS

Jean Jules Achille Robillard, Stockholm-Vallingby, Sweden

Application February 6, 1956, Serial No. 563,623

7 Claims. (Cl. 324—102)

This invention relates to a device for electrically measuring transient electrical phenomena, such as the energy in a pulse of voltage, and for generating such a pulse whose energy is related to the speed of a moving object, for example, an automobile.

An object of this invention is to provide a very simple and inexpensive device for accurately measuring the energy in electrical pulses.

A further object is to provide such a device which can give a steady, direct meter reading proportional to the energy in a pulse.

A more specific object is to provide a very efficient but greatly simplified apparatus for measuring the speed of moving objects such as automobiles.

These and other objects will in part be understood from and in part pointed out in the description of the invention given hereinafter.

The invention is shown and described herein as specifically applied to a device for measuring the speed of automobiles. However it has many other uses, some of which will be mentioned hereinafter.

At the present time, the police forces in nearly every State use some kind of electrical equipment for measuring the speed of automobiles. One of the most popular speed measuring systems uses radar in which high frequency radio waves are beamed from a roadside transmitter to the moving automobiles, being reflected back by the automobiles and then detected at the transmitter. An obvious advantage of this system is its unobtrusiveness, which permits it to operate without warning to the motorist. However, there are numerous disadvantages to such a system, some of these being the very high cost of the equipment, its large size and delicate nature, and its complicated use and operation. The present invention seeks to provide a speed measuring system not having these disadvantages but yet as accurate and as unobtrusive as radar.

In accordance with an aspect of the invention, light rays from a moving vehicle are used to generate successive pulses the time separation of which is inversely proportional to the speed of the vehicle. These pulses are then converted into a single pulse of known amplitude whose duration is equal to the spacing of the two pulses. This single pulse is in turn integrated by an electromechanical meter, provided according to a specific aspect of the invention, to give a meter reading proportional to the speed of the vehicle.

The total equipment required to measure speed according to the invention is extremely compact, fitting entirely into a housing no larger than a conventional box camera. The cost of this equipment is correspondingly small and is only a small fraction of the cost of a radar system, for example.

In considering the specific aspect of the invention relating to the electro-mechanical meter, it is well to remember that in the past the measurement of the energy in a short duration electrical pulse required complex and expensive equipment. It was formerly very difficult to convert a short duration, low energy electrical pulse into a steady state meter reading, particularly into an accurate meter reading. The present invention however provides a very simple and inexpensive way of doing this.

The meter device provided according to a specific aspect of the invention includes an ordinary microammeter which is electrically and mechanically coupled to a holding circuit so that, for example, a small, 0.1 microsecond pulse will give a steady state, full scale meter reading. Pulses of proportional energy give proportional meter readings.

A bettter understanding of the general nature of the invention together with a fuller appreciation of its many advantages will best be gained from a study of the following description given in connection with the accompanying drawings in which:

Figure 1 is a perspective view of a speed measuring device embodying features of the invention;

Figure 2 is a schematic diagram of the proportion of the apparatus shown in Figure 1 which produces a pulse of a duration proportional to the speed of an automobile passing in front of the apparatus;

Figure 3 is a schematic diagram of the proportion of the apparatus which produces a steady-state meter reading proportional to the duration of pulses obtained, for example, as in Figure 2.

Referring to Figure 1, the camera box 10, having dimensions, for example, of 4 by 5 by 6 inches, is adapted to contain all of the parts and elements provided according to the invention to measure the speed of automobiles. The rear side of the box has a meter scale 12 calibrated in miles per hour and on which the pointer 14 indicates speed. The front of the box 10 contains the usual lens.

As seen in Figure 2, box 10, shown in dotted outline, is adapted to be mounted alongside a road with the lens 16 pointed toward the road generally at right angles thereto. Lens 16 is adapted to focus rays of light coming along the lines 18 and 20 on the photoelectric tube generally indicated at 22. These light rays can be obtained artificially if desired, as from an infra-red light source which is invisible at night. The light source can be positioned near the camera box and the light rays reflected from the vehicle back to the box or two sources can be positioned opposite the camera box on the opposite side of the road to beam their rays along lines 18 and 20. Lines 18 and 20 pass through respective openings 24 and 26 in the light baffle 28, the lateral distance between these openings being chosen so that light can strike phototube 22 only along lines 18 and 20. This baffle excludes all other rays from impinging on tube 22.

The angular distance between lines 18 and 20 is made such that when box 10 is positioned a given distance, for example, about 10 feet, from the road, an automobile will at some time during its travel intersect both lines at once. This assures that each automobile will be identified separately by the apparatus. When the front of an automobile cuts line 18, a pulse 30 will be produced by tube 22. A short interval $t$ later and before the automobile has passed beyond line 18, the front end of the automobile will intersect line 20. This will give rise to a second pulse 31.

Pulses 30 and 31 are fed via transformer 32 through a switch 33 into an amplifier and shaper 34 and then into a flip-flop circuit 36, both of which are well known to the art and which need not be described further. In this way, a single pulse 38 of constant amplitude and of duration $t$ is obtained at the terminals 40, 42. The electrical energy contained in pulse 38, since the pulse is of constant amplitude regardless of its duration, is proportional to interval $t$ and hence inversely proportional to the speed of the automobile.

The same pulse obtained at terminals 40, 42 is also used to prevent the generation of a second such pulse before this one can be measured. To this end, an amplifier 43 is connected to lead 40 and is adapted, through the relay coil and armature generally indicated at 44, to open switch 33 as shown by the dotted lines. A stub 46 attached to the armature is provided so that switch 33 can be closed manually when desired. This stub protrudes outside box 10 as seen in Figure 1.

Figure 3 shows an electro-mechanical meter 50, provided according to a specific aspect of the invention, for measuring the energy of pulses appearing at terminals 40, 42 corresponding to those in Figure 2. As seen in Figure 3, meter 50 includes a standard meter movement 52 having a coil 53, connected to terminals 40, 42, and rotatable around a fixed magnetic core 54. The fixed magnets 55 generate a magnetic flux which coil 53 cuts through. The deflection of coil 53 controls the indication of pointer 14 in the well known way, the coil being biased to the position shown by the hairspring 57.

Connected by shaft 56 to coil 53 and adapted to rotate with it is the coil 58. This last is rotatable within the fixed coil 60 and is positioned relative to it so that when coil 53 is at zero deflection, coils 58 and 60 are at right angles to each other and the mutual coupling between them is zero. A shield plate 62 is placed between coils 58, 60 and coil 53 to eliminate magnetic coupling from coil 53 and magnets 55 to coils 58, 60.

Coil 58 is connected to an alternating current source 64 having a frequency of, for example, 1000 cycles. The output voltage of this source is adjustable by means of the potentiometer 66.

When a voltage pulse positive with respect to ground appears at terminal 40, meter 52 will be deflected by an amount proportional to the energy contained in the pulse. Ordinarily, however, for meter 52 alone the deflection of pointer 14 would be so short lived, i. e. it would return to zero so fast that no reading on scale 12 could possibly be obtained directly by a human observer. In the arrangement illustrated, when coil 53 is deflected, coil 58 will be deflected in like amount. The latter will in turn, by transformer action, then induce in coil 60 an alternating voltage proportional to the deflection of coil 58 and hence of coil 53. This alternating voltage is connected via the leads 68, 70 to the bridge rectifier, generally indicated at 72 where it is converted into a positive direct voltage and applied to lead 74. The magnitude of the voltage on lead 74 is adjusted by the potentiometer 76. Lead 74 is connected to terminal 40 and thus establishes at this terminal, as a result of a positive pulse there, such as pulse 38 in Figure 2, a voltage which maintains the deflection of pointer 14 at a value proportional to the energy of the positive pulse. In this way a steady state meter deflection can be obtained for pulses as short as 0.1 microsecond duration.

To prevent potentiometer 76 from loading terminals 40, 42 on a positive pulse, a diode 78 is inserted in lead 74 and poled to block current flow from terminal 40 to potentiometer 76.

Meter 52 can be one commercially available, for example an ordinary 50 microampere meter. Coils 58 and 60 can be obtained from meters similar to meter 52. The amount of voltage supplied by generator 64 can be of the order of from 5 to 10 volts. The settings of potentiometers 66 and 76 should be adjusted in conjunction with each other so that when a positive pulse having, for example, an amplitude of one volt and a duration of, for example, one millisecond, is applied to terminal 40, pointer 14 will reach and maintain for a period of time a steady state deflection. Potentiometer 66 has the greater effect on the circuit for large deflections of coil 58 and should be adjusted to give stability with full scale or nearly full scale meter deflections. Potentiometer 76 on the other hand should be adjusted to give low scale stability.

An automatic record of speeding automobiles can be obtained by providing in addition to the apparatus described a magazine camera for photographing the license number of each automobile exceeding the speed limit. This camera would be triggered by pointer 14 each time it deflected beyond a given maximum value.

From the above description it is evident that the invention provides a very portable and inexpensive apparatus which can measure easily and accurately from a remote point the speed of automobiles. The speeds of other objects such as ballistic missiles can be of course measured in similar fashion. In addition the energy in various short duration electrical pulses can be measured even though obtained in a way different from that illustrated herein.

The above description is intended in illustration and not in limitation of the invention. Various minor changes and modifications in the apparatus illustrated may occur to those skilled in the art and these may be made without departing from the spirit or scope of the invention as set forth.

I claim:

1. An electro-mechanical device for obtaining a steady state meter reading proportional to the energy in a short duration electric pulse, said device comprising a meter movement having means to establish a magnetic field, a coil within said field movable relative thereto by an amount proportional to the energy in said pulse, a transformer having an input and an output and whose ratio of input to output signal is controlled by the relative position of said coil in said magnetic field, source means for supplying an alternating voltage to the input of said transformer, and means including a rectifier for connecting the output of said transformer to said coil, whereby when a short pulse is applied to said coil, it will assume and maintain a substantially steady state displacement relative to said magnetic field.

2. In an electro-mechanical device for obtaining a steady state meter reading proportional to the energy in a short duration electric pulse, a microammeter having a main rotatable coil and having means establishing a steady state magnetic field through which said main coil is adapted to rotate from a rest position an amount proportional to the energy in a short pulse, first and second auxiliary coils, one of which is fixed and the other of which is rotatable along with said main coil, the orientation of said main and auxiliary coils being such that when said main coil is at rest the mutual coupling between said auxiliary coils is substantially zero, and means for supplying from one of said auxiliary coils to said main coil a direct current signal of magnitude such that when deflected by a short pulse said main coil will assume and maintain a deflection proportional to the energy in said pulse, said means including a source of alternating voltage connected to one of said auxiliary coils and a rectifier connected between the other of said auxiliary coils and said main coil.

3. The combination of elements as in claim 2 in further combination with means to prevent coupling between said meter and said auxiliary coils.

4. An electro-mechanical device for measuring the length of a short duration, known amplitude electrical pulse, said device comprising a main coil, a shaft rotatably supporting said coil, means biasing said main coil to a rest position, means establishing a magnetic field through which said main coil can rotate from said rest position to a fully deflected position, means including a pointer for physically indicating the deflection of said main coil, and energy supply means controlled by deflection of said main coil and including a source whose output voltage is proportional to the deflection of said main coil for applying to said main coil a signal of amplitude and polarity such that when said main coil is energized by a short duration electrical pulse, said main coil will assume and maintain a deflection proportional to the energy in said pulse.

5. The combination of elements as in claim 4 wherein said energy supply means includes first and second auxiliary coils, one of which is rotatable directly with said main coil, the other of which is fixed, said auxiliary coils being oriented such that the mutual coupling between them is zero when said main coil is at rest position, and such that the mutual coupling increases in proportion to the deflection of said main coil.

6. An electro-mechanical mechanism of the character described comprising flux means for establishing a steady state energizing field, a conductor movable in accordance with an electric signal applied to it in said field from a rest position to which it is normally biased, terminal means for applying to said conductor an electric signal, the magnitude of said signal determining the amount by which said conductor will be displaced from its rest position, and positive feedback means for applying to said conductor a control signal substantially equal to said electric signal, said feedback means including an electric energy source, and control means responsive to movement of said conductor to derive from said source and to apply a control signal to said conductor, whereby when said conductor is displaced an amount from its rest position by a finite short-duration electric signal applied to said terminal means, a control signal will be generated and applied to said conductor to hold it displaced by said amount even after said electric signal has disappeared.

7. Apparatus for recording a very short duration electrical pulse, comprising means establishing an energizing magnetic field, a conductor movable in said field, said conductor having a normal rest position from which it is adapted to be deflected and held in another position determined by the current in said conductor, input means to apply a very short duration electric pulse to said conductor to impart an impulse of momentum thereto, and positive feedback means for applying to said conductor a feedback current of magnitude sufficient to give a steady deflection proportional to the size of said very short pulse, said feedback means including a source of electric current, and a variable element connected to said source for applying to said conductor said feedback current, said variable element being coupled to said conductor and controlled by deflection of it to determine the amount of said feedback current.

References Cited in the file of this patent

UNITED STATES PATENTS

| | | |
|---|---|---|
| 2,364,474 | Rich | Dec. 5, 1944 |
| 2,559,849 | Covert | July 10, 1951 |
| 2,617,842 | Fink | Nov. 11, 1952 |
| 2,620,380 | Baldwin | Dec. 2, 1952 |